UNITED STATES PATENT OFFICE 2,596,091

NONIONIC SURFACE-ACTIVE AGENTS

Peter L. de Benneville, Philadelphia, Pa., assignor to Rohm & Haas Company, Philadelphia, Pa., a corporation of Delaware No Drawing. Application March 28, 1950, Serial No. 152,518

18 Claims. (Cl. 260—611)

This invention relates to non-ionic surface-active agents which are relatively chemically inert and highly stable and to a process by which they are prepared.

These agents have the chemical structure

$R^1R^2R^3ArCH_2(OCH_2CH_2)_nOR^4$ wherein $R^1$ is an alkyl group of at least six carbon atoms, $R^2$ and $R^3$ are hydrogen or the methyl group, $R^4$ is an alkyl group of not over four carbon atoms, Ar is a hydrocarbon nucleus of the benzene or naphthalene series, and $n$ is a number of at least six. These compounds are prepared by reacting a halomethylated alkylated aromatic hydrocarbon with a monoether of a polyethylene glycol in the presence of an alkali metal hydroxide.

Reaction of long-chained alcohols, phenols, thiols, carboxylic acids, amides, and non-tertiary amines with ethylene oxide leads to polyether alcohols which have surface activity. Fatty acids may be reacted with polyglycols to yield similar products. In all of these known ways of producing surface-active compounds the presence of a reactive hydrogen in the long-chained starting material is essential. As choice and availability of starting materials are limited by practical considerations, it is desirable to have other methods for producing non-ionic compounds, which are derived from other starting materials. I have discovered that alkylbenzyl halides or alkylnaphthylmethyl halides can be used as starting materials and that these halides behave in an unexpected manner.

The alkylbenzyl or alkylnaphthylmethyl halides are available through alkylation of benzene, toluene, xylene, naphthalene, or a methylnaphthalene followed by halomethylation. In the alkylation step the alkyl group may be obtained from olefines of six or more carbon atoms as well as from alcohols or alkyl halides. There are thus available relatively inexpensive starting materials in wide variety.

As is known, alkyl groups of 12 to 15 carbon atoms, for example, can be obtained from kerosenes through chlorination and condensation of the resulting chloride with an aromatic hydrocarbon under the influence of a Friedel-Crafts catalyst, such as aluminum chloride. It is also known that alkyl groups can be introduced from alcohols or olefines under the influence of acidic catalysts. Another method is based on introduction of an acyl group by the Friedel-Crafts reaction followed by reduction of the carbonyl group.

The alkylated aromatic hydrocarbons which are useful are those having an alkyl group of six to eighteen carbon atoms attached to a benzene or naphthalene ring. The presence of one or two methyl groups in the ring does not interfere with the reactions. In fact, the presence of such groups in many instances seems to improve the reactions which are here-involved. The exact form of the alkyl group is not of importance. It may be straight or branched, primary, secondary, or tertiary. The relative position of alkyl group and methyl group is not critical. Typical alkylated hydrocarbons which are useful include hexylbenzene, hexyltoluene, hexylnaphthalene, hexylmethylnaphthalene, (1 - methylhexyl)benzene, (1 - ethylpentyl)benzene, (1,3 - dimethyl-1-propylbutyl)benzene, (1 - methylhexyl)toluene, (1-ethylpentyl)toluene, (1 - methylhexyl)xylene, (1-ethylpentyl)xylene, (1-methylhexyl)naphthalene, (1 - methylhexyl)dimethylnaphthalene, (1-methylheptyl)benzene, (1 - methylheptyl)xylene, (1 - methylheptyl)naphthalene, (2 - ethylhexyl)-toluene, (3,5,5-trimethylhexyl)benzene, (1,2,4,4-tetramethylpentyl)toluene, octylmethylnaphthalenes, (1 - methylnonyl)benzene, (1 - methylnonyl)naphthalene, decylbenzene, dodecylbenzene, dodecyltoluene, tert.-dodecylbenzene, dodecylnaphthalene, tetradecylbenzenes, tetradecyltoluenes, tetradecylnaphthalenes, hexadecylbenzenes, hexadecylnaphthalenes, octadecylbenzene, octadecyltoluene, etc. The alkylated material used may be a single compound or it may be a mixture. The mixture may be a result of the isomeric forms introduced from a given source of the alkyl group or result from use of a mixture supplying the alkyl group.

The alkylated aromatic hydrocarbon is halomethylated. While the —$CH_2Br$ group may be introduced in a satisfactory manner and, although it reacts to give the desired polyethers, the chloromethyl group is economically advantageous and, therefore, preferred. Introduction of a —$CH_2X$ group into naphthalene, benzene, toluene, or xylene occurs readily under mild conditions. When, however, there is present an alkyl group of a size sufficient to supply a distinctly hydrophobic quality to the hydrocarbon portion of the surface-active compound, difficulty of halomethylation requires more exacting conditions than in the case of the simpler aromatic hydrocarbons. Alkylnaphthalenes are more readily halomethylated than the alkylbenzenes. When the alkyl substituent is as large as hexyl, special methods of halomethylation become advisable if the reaction is to be primarily directed to monohalomethylation and halomethylation is to be carried toward completion.

When the alkyl substituent is of the order of six to eight carbon atoms, a fair degree of halomethylation can be accomplished in an anhydrous system with zinc chloride as catalyst. Yet a considerable proportion of unreacted hydrocarbon will remain. The presence of a lower aliphatic monocarboxylic acid, such as formic, acetic, chloroacetic, or propionic, brings about a remarkable improvement in the action of the zinc chloride. Acid anhydride can be used in place of or in admixture with the acid. The improvement resulting from use of zinc chloride together with acid is probably due to the formation of a complex. This complex gives particularly favorable results when the alkyl group contains at least eight carbon atoms.

A mixture of one molecular proportion of zinc chloride with 1.5 to 8 molecular proportions of an aliphatic monocarboxylic acid of not over three carbon atoms is most effective. In the preferred conditions of reaction 0.75 to 2.5 molecular proportions of zinc chloride are used per molecular proportion of alkylated aromatic hydrocarbon when the alkyl group thereof is about ten carbon atoms or more. Less zinc chloride can be used as the size of the alkyl group diminishes.

For one mole equivalent of alkylbenzene or alkylnaphthalene one to 2.5 mole equivalents of formaldehyde are used. The formaldehyde may be supplied in an anhydrous form from a revertible polymer. Anhydrous hydrogen chloride or bromide is supplied to the reaction mixture. At reaction temperatures of 50° C. to 100° C. under conditions described a halomethyl group is introduced without formation of resinous material. In place of formaldehyde polymer and hydrogen chloride or bromide there may be used a halomethyl ether with good results.

Preparation of halomethylated alkylated aromatic compounds is described with details of procedure in the following illustrative examples.

*Example 1*

Hexylbenzene, prepared by the alkylation of benzene with propylene dimer, was mixed in an amount of 60 parts by weight with 25 parts of zinc chloride and 25 parts of acetic acid and heated to 50° C. Thereto over a period of an hour 40 parts of dichloromethyl ether was added with stirring. The reaction mixture was stirred and held at 55° C. to 60° C. for an hour. It was then cooled. Layers were allowed to form and the upper layer was taken. This was washed with water and sodium bicarbonate solution and then distilled under reduced pressure. The fraction collected at 120° C.–130° C./0.2 mm. corresponded in composition to hexylbenzyl chloride. It was chiefly the para isomer.

*Example 2*

Commercial 3-heptanol was dehydrated at 400° C. on an alumina catalyst and the heptene therefrom redistilled. A mixture was made with 125 parts by weight of this olefine, 198 parts of benzene, and 196 parts of sulfuric acid cooled to 50° C. The mixture was stirred for three hours, allowed to form layers, and separated. The organic layer was washed with water and a small amount of a soda ash solution, dried, and distilled under reduced pressure to yield 167 parts of heptylbenzene.

A mixture was made from 160 parts of this product, 90 parts of anhydrous zinc chloride, and 138 parts of glacial acetic acid. Thereto 106 parts of dichloromethyl ether were added with stirring while the temperature of the reaction mixture was kept at 60° C. The reaction mixture was stirred for five hours while this temperature was maintained. The mixture was cooled, allowed to form layers, and separated. The product layer was washed, dried, and fractionally distilled. Pure heptylbenzyl chloride was collected at 127°–132° C./0.2 mm.

*Example 3*

A mixture of 95 parts by weight of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C. while hydrogen chloride was passed in for two hours at a fairly rapid rate. The reaction mixture was allowed to stratify and the upper layer was taken, washed with hot water, with a 10% sodium bicarbonate solution, and with hot water, dried over sodium sulfate and distilled. The forerun of 30 parts consisted of octylbenzene. There was then obtained at 119°–121° C./1 mm. 71 parts of octylbenzyl chloride.

*Example 4*

To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174° C./2 mm. there was obtained a fraction corresponding in composition to octylbenzyl bromide. It contained by analysis 28.8% of bromide. Theory for this product is 28.3%.

*Example 5*

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

*Example 6*

To a mixture of 70 parts of 2-ethylhexylbenzene (prepared according to the method of Sulzbacher and Bergmann, J. Org. Chem. 13, 303 (1948)), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers were then allowed to form and separated. The product layer was washed with sodium bicarbonate solution and distilled at 110°–125° C./0.07 mm. The distillate corresponded in composition to 2-ethylhexylbenzyl chloride.

*Example 7*

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in the reaction vessel equipped with a stirrer of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

*Example 8*

(a) Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

(b) A portion of 3,5,5-trimethylhexyl alcohol was dehydrated as in Example 8a and 125 parts of the nonenes therefrom reacted with 200 parts of xylene and 125 parts of sulfuric acid at about 0° C. for four hours. The reaction mixture was allowed to stand. Layers formed and were separated. The organic layer was washed, dried, and distilled at low pressure. One hundred parts of the main fraction was mixed with 50 parts of zinc chloride and 70 parts of glacial acetic acid. Thereto was added 50 parts of dichloromethyl ether. The reaction mixture was gradually warmed to about 75° C. and stirred for four hours. The mixture was allowed to stand. It formed layers, which were separated. The organic layer was washed with water, sodium bicarbonate solution, and again with water, and dried over calcium sulfate. The product obtained gave an analysis which corresponded closely to that for nonyldimethylbenzyl chloride.

*Example 9*

(a) The procedure of Example 8b was applied to naphthalene in place of xylene. There was obtained nonylnaphthylmethyl chloride of good purity.

(b) A mixture was made from 100 parts of propylene dimer, 150 parts of dimethylnaphthalene, and 150 parts of sulfuric acid, which had been chilled to about 0° C. The mixture was stirred at 0°–5° C. for two hours and then for two hours without cooling. The reaction mixture was left standing until layers formed. They were separated. The organic layer was washed with water, with soda ash solution, and with water again, was dried over calcium sulfate, and heated under low pressure to remove unreacted starting material. The product remaining had the correct composition for hexyldimethylnaphthalene.

A mixture was made from 120 parts of this product, 50 parts of zinc chloride, 75 parts of acetic acid, 15 parts of acetic anhydride, and 25 parts of paraformaldehyde. Hydrogen chloride was passed into the mixture while it was stirred. Reaction began and carried the temperature to about 80° C., where it was controlled by rate of addition of hydrogen chloride and by cooling. After three hours the mixture was left standing. Layers formed and were separated. The upper layer was washed with water, with 10% sodium bicarbonate solution, and with water. It was dried over calcium sulfate and heated under low pressure. The product was essentially hexyldimethylnaphthylmethyl chloride.

(c) There were mixed 156 parts of a crude methylnaphthalene and 156 parts of sulfuric acid, both of which had been chilled to 0° C. The mixture was stirred and 212 parts of propylene tetramer was slowly added, maintaining the temperature below 20° C. The reaction mixture was stirred for three hours at room temperature and the organic layer was then separated and distilled. There was thus obtained 122 parts of dodecylmethylnaphthalene boiling over the range of 160°–220° C. at 0.65 mm. of mercury.

A mixture of 155 parts of this product, 75 parts of zinc chloride, and 100 parts of acetic acid was stirred and thereto was added 105 parts of chloromethyl ether over a period of an hour with the temperature at 70° C. The temperature was maintained at this level and stirring was continued for three hours. The layers were separated as in previous examples and dodecylmethylnaphthylmethyl chloride obtained as a residue.

(d) To a mixture of 96 parts of naphthalene and 60 parts of 96% sulfuric acid cooled below 10° C. there was added over a period of 40 minutes 101 parts of propylene polymer which averaged four propylene units. The reaction mixture was stirred for three hours. Layers were allowed to form and were separated. The organic layer was treated with a little lime and distilled. After a forerun of naphthalene, there was obtained a dark-colored oil distilling at 185°–263° C./5 mm. and amounting to 108 parts by weight. This oil was redistilled, a fraction of 83 parts being taken at 185°–225° C./3 mm. which corresponded closely in composition to dodecylnaphthalene. The molecular weight determined ebullioscopically was 305 (theory, 296).

There were mixed 65 parts of this product, 13.5 parts of paraformaldehyde, 30 parts of anhydrous zinc chloride, and 100 parts of glacial acetic acid. Into this mixture at 50°–70° C. hydrogen chloride was passed for five hours. Layers were formed and separated. The upper layer was washed with water and with dilute sodium bicarbonate solution. It was stripped under low pressure to yield 63 parts of a light brown, viscous oil which was essentially dodecylnaphthylmethyl chloride. It contained by analysis 10.8% of chlorine (theory, 10.4%).

*Example 10*

To a mixture of 312 parts of benzene and 180 parts of sulfuric acid was added dropwise at 10°–20° C. 281 parts of decene, which was freshly prepared by dehydration of n-decanol on alumina. The mixture was stirred for five hours at room temperature. It was then allowed to form layers. The upper layer was separated, washed with concentrated sulfuric acid twice, and distilled. The fraction distilling at 115°–127° C./1.3 mm. was identified as sec.-decylbenzene.

A mixture of 54.5 parts of this sec.-decylbenzene, 27.3 parts of zinc chloride, and 60 parts of glacial acetic acid was stirred and heated to 70°–75° C. while 28.8 parts of dichloromethyl ether was slowly added. Stirring was continued at 70°–80° C. for five hours. Layers were allowed to form. The upper layer was separated, washed with water and sodium bicarbonate solution, dried, and distilled. At 155°–175° C./1.8 mm. there was obtained a fraction of 30 parts which corresponded in composition to sec.-decylbenzyl chloride.

*Example 11*

Dodecyltoluene was prepared by mixing 344 parts of toluene and 294 parts of concentrated sulfuric acid and, while the mixture was stirred and the temperature maintained below 10° C., dodecylene was slowly added. The dodecylene used was a propylene tetramer. After 506 parts of dodecylene were added, the mixture was allowed to come to room temperature and stirring was continued for 24 hours. After separation from the acid layer, the product was washed with concentrated sulfuric acid and distilled in vacuo. Five hundred fifty-five parts of a colorless liquid boiling at 110°–160° C. at 1.2–2.2 mm. of mercury was obtained.

A mixture of 450 parts of dodecyltoluene with 105 parts of formaldehyde, 175 parts of anhydrous zinc chloride, and 250 parts of glacial acetic acid was stirred at 60°–70° C. while hydrogen chloride was passed in rapidly for two hours. Absorption was rapid and the reaction was accompanied by a rise of temperature. The lower catalyst layer was drained off and the product washed with water, 10% sodium carbonate solution, and again with water, then dried in vacuo on a steam-bath. Four hundred ninety parts of a yellow liquid having a chlorine content of 11.2% was obtained. The theoretical chlorine content of dodecylmethylbenzyl chloride is 11.5%. This material distills almost completely at 145°–185° C. at 0.5–1 mm. of mercury. It may, however, be used without further purification.

*Example 12*

To a mixture of 156 parts of benzene and 110 parts of anhydrous hydrofluoric acid at 0°–5° C. was added 252 parts of octadecylene at such a rate that the temperature did not exceed 10° C. The mixture was then stirred for three and one-half hours at 5°–10° C. and after it had stood overnight at room temperature the mixture was poured on ice, washed with water, then with 10% sodium bicarbonate and water, dried, and distilled. The product was collected between 195° and 210° C. at 1.5–2 mm. mercury, amounting to 225 parts.

To a mixture of 30 parts of octadecylbenzene, 35 parts of anhydrous zinc chloride and 80 parts of glacial acetic acid was added 16 parts of bis-chloromethyl ether dropwise at 55° C. The mixture was then stirred for two and one-half hours, allowed to stand overnight and the upper product layer separated, dissolved in benzene and washed with water, 10% sodium bicarbonate and water, and dried over anhydrous calcium chloride. The benzene was stripped to yield 32 parts of a straw-colored liquid containing 9.02% chlorine (theory 9.37%). This was essentially octadecylbenzyl chloride.

*Example 13*

Hydrogen chloride was passed into a mixture of 104 parts of dodecyltoluene, 24 parts of paraformaldehyde, 53.3 parts of zinc chloride and 59.2 parts of propionic acid for two hours at 70° C. The reaction product was worked up as in the preceding example. One hundred eighteen parts of methyldodecylbenzyl chloride was obtained.

*Example 14*

To a mixture of 138 parts of toluene and 150 parts of sulfuric acid at about 0° C. there was slowly added with stirring 196 parts of an olefine fraction which contained olefines from $C_{12}$ to $C_{15}$ and averaged $C_{14}$. The mixture was stirred at 0°–10° C. for three hours and then separated. After the organic layer had been washed with water and soda ash solution, it was dried and distilled. A fraction obtained between 120° and 160° C. at 2 to 0.5 mm. consisted of alkylated methylbenzene.

It was mixed with zinc chloride and acetic acid as in previous examples and chloromethylated with chloromethyl ether. When tests showed that the product was essentially a monochloromethylated material, the reaction was stopped. The product was washed and dried to yield alkylmethylbenzyl chlorides in which the alkyl group on the average contained fourteen carbon atoms.

*Example 15*

For the preparation of alkylbenzenes from relatively inexpensive materials kerosene or close-cut naphthas may be taken. For instance, an aliphatic type distillate having a distillation range of 190° to 250° C. and having an average molecular weight of about 190 was chlorinated until one equivalent of chlorine was taken up per average molecular unit. The alkylchlorides thus formed were reacted with toluene in the presence of 10% of its weight of aluminum chloride. The resulting alkyltoluenes were stripped free of reactants and distilled at low pressures from 100°–160° C./2–0.5 mm.

A portion of the distillate in an amount of 75 parts was mixed with 12 parts of paraformaldehyde, 30 parts of zinc chloride, 30 parts of acetic acid, and 30 parts of acetic anhydride. The mixture was heated to about 60° C. and hydrogen chloride was passed in. The temperature increased to about 85° C. After three hours the mixture was cooled. Layers formed and were separated. The organic layer was washed with water, with 10% sodium bicarbonate solution and again with water. The product was dried over calcium sulfate.

The monoethers of polyethylene glycols to be reacted with the alkylbenzyl halides or alkylnaphthylmethyl halides in the presence of an alkali metal hydroxide have the formula $$H(OCH_2CH_2)_nOR^4$$

where $R^4$ is a methyl, ethyl, propyl, or butyl group and $n$ is a number having a value of at least six. The monoethers are readily made by reaction of a lower saturated aliphatic monohydric alcohol and ethylene oxide. The reaction may be effected in the presence of a small amount of an alkali hydroxide or alkali metal alcoholate as catalyst. Ethylene oxide may be used as a liquid or as a gas, and the reaction may be run under pressure and at temperatures between 50° and 150° C. The reaction is allowed to continue until enough ethylene oxide has been consumed to give the length of polyether chain desired. It is desirable to add at least enough ethoxy units to ensure ready dispersibility or solubility of the final product in water. Usually at least six ethoxy groups are needed but this minimum number depends in part upon the size of the alkyl group present on the aromatic ring and upon the size of the alkyl group $R^4$.

Instead of building up the ether chain by starting with the alcohol, $R^4OH$, there may for convenience be taken one of the commercially available ether alcohols which already have one or two glycol units. Thus methoxyethanol, methoxyethoxyethanol, ethoxyethanol, butoxyethanol, propoxyethoxyethanol, or the like are high-boiling liquids which readily yield the desired monoether polyglycols.

Some typical preparations of such compounds follow:

*Example 16*

A mixture of 152 parts of methoxyethanol and one part of powdered potassium hydroxide was placed in a reaction vessel equipped with a stirrer, a device for venting and for emergency blow-off, thermometer, and inlet tube connected to a manometer and supply of ethylene oxide in a container. The tube was also connected to a nitrogen supply. The system was flushed with nitrogen and the reaction vessel heated to 80° C. Ethylene oxide was distilled slowly into the reaction mixture. From time to time the vessel was vented to remove nitrogen and the pressure was held at about 9 inches of mercury. The heat of reaction raised the temperature to about 150° C. When 561 parts of ethylene oxide had been added, the reaction mixture was cooled under a nitrogen atmosphere. The product was neutralized with a little sulfuric acid. The product obtained was a mixture of polyethers in which $n$ had a value chiefly of 7 and 8, averaging 7.4. Some of this product was used to yield surface-active agents by reaction with aromatic methyl halides by methods shown below.

*Example 17*

Another part of the above product was treated with one-half per cent of its weight of potassium hydroxide and returned to the reaction vessel. The vessel was swept out as before and heated to 75°–80° C. Ethylene oxide was distilled and passed into the above product as before. The temperature rose to about 150° C. The reaction was continued until the amount of ethylene oxide reacted corresponded to a value of 9 for $n$. A part of the reaction product was taken at this point for use in a later reaction with alkylbenzyl halides. This product was of the composition $$CH_3(OCH_2CH_2)_9OH$$

*Example 18*

The rest of the above reaction product was returned to the flask and reacted with additional ethylene oxide. When the amount of ethylene oxide used corresponded to that required for an $n$ value of 15, a portion of the reaction mixture was taken and neutralized.

The remaining portion of the reaction mixture was further treated with ethylene oxide until enough of this oxide had been consumed to yield a product having forty oxyethyl groups.

*Example 19*

(a) A mixture of 180 parts of ethoxyethanol and one part of powdered potassium hydroxide was treated with ethylene oxide as described in Example 16. When 900 parts of ethylene oxide had been passed into the reaction mixture, the mixture was cooled and neutralized. The product obtained had the formula $$C_2H_5(OC_2H_4)_nOH$$

where $n$ had a value of about 11.

(b) As in Example 17, part of the product obtained in Example 19a was taken, treated with potassium hydroxide, and reacted as above with ethylene oxide until $n$ had a value of 15. The resulting product was divided. Part was neutralized and set aside for later use and the rest was treated with ethylene oxide until a product with an $n$ value of about 20 was obtained.

*Example 20*

(a) A mixture of 118 parts of butoxyethanol and one part of potassium hydroxide was stirred and heated under nitrogen to 85° C. and ethylene oxide was passed in as above until 400 parts by weight of ethylene oxide had been consumed. The resulting product had the structure $$C_4H_9(OC_2H_4)_nOH$$

where $n$ had a value of about 10.

(b) A mixture of 74 parts of butyl alcohol and 0.5 part of potassium hydroxide was stirred and heated under nitrogen to about 75° C. Ethylene oxide was slowly passed in so that the rise in temperature was not rapid. The reaction was continued until 440 parts of ethylene oxide had been reacted. The reaction mixture was then cooled and neutralized. The product was not distinguishable from that obtained by procedure (a) above.

A monoether of a polyglycol, such as prepared in the above examples, is reacted with an alkylated benzyl or naphthylmethyl halide in the presence of an alkali metal hydroxide. Theoretically, the monoether, halide, and hydroxide are used in equimolecular proportions and the reaction may be carried out on this basis. It is preferred, however, to use a small excess of the halide, 1.1 moles to 1.5 moles of halide per mole of monoether giving excellent results.

The excess of halide can be removed at the end of the reaction by extraction. The product is conveniently taken up in water and alcohol and extracted with a volatile hydrocarbon solvent, such as heptane. This leaves a solution of practically pure surface-active polyether, which can be recovered, if desired, upon evaporation of alcohol and water.

The temperature of reaction may be from 80° to 150° C., about 90° to 110° C. being the preferred temperature range. The reaction is usually complete within one to five hours. The reaction mixture can then be cooled and the halide salt removed by filtration. Dilution with a solvent for the polyether product assists in this operation.

Examples of the reaction of monoether and halide follow. Parts are by weight.

Example 21

(a) A mixture of 4.1 parts by weight of sodium hydroxide and 29.6 parts by weight of $$CH_3(OC_2H_4)_6OH$$

was placed in a reaction vessel and stirred and heated to 90° C. There was then slowly added with stirring 21.1 parts of hexylbenzyl chloride while the reaction temperature was maintained at 90° to 100° C. The temperature was then kept at 100° to 110° C. for two hours. The product was taken up in a little toluene and filtered to remove salt. The solvent was then evaporated under reduced pressure to yield 45 parts of an oily product which corresponded in composition to $$C_6H_{13}C_6H_4(OC_2H_4)_6OCH_3$$

It was soluble in water. Its aqueous solutions had low surface tensions. Interfacial tensions between oil and dilute solutions of the above product were also low.

(b) By the same procedure there were reacted 14.9 parts of potassium hydroxide, 114 parts of $CH_3(OC_2H_4)_9OH$, and 60 parts of hexylbenzyl chloride at 110° C. The reaction mixture was heated up to 150° C. and then cooled. Salt was removed after dilution with toluene. The toluene was stripped off to yield 145 parts of an oil, which was soluble in water and displayed capillary activity.

Example 22

A solution was prepared from 5.61 parts of potassium hydroxide and 42.8 parts of $$CH_3(OC_2H_4)_9OH$$

placed in a reaction vessel, and heated to about 100° C. Thereto was slowly added with stirring 26.3 parts of nonylbenzyl chloride. Heating was continued for 15 minutes with the temperature at 100° C. A test then indicated that the product gave a clear solution in water. The reaction mixture was heated for 1.5 hours more at 100° C. to insure completion of the reaction. The reaction mixture was cooled, taken up in 100 parts of isopropanol, and filtered. The solvent was removed by heating under reduced pressure to yield 65 parts of a clear amber oil, which had the composition $$C_9H_{19}C_6H_4CH_2(OC_2H_4)_9OCH_3$$

It was water-soluble and its solutions were capillary active. The wetting-out time of a floating canvas patch on a 0.5% solution was four seconds. A 0.2% solution gave a wetting-out time of eight seconds, a 0.1% solution a time of 12 seconds, and a 0.05% solution a time of 18 seconds, all by the floating patch method.

Example 23

To a mixture of 6.2 parts of potassium hydroxide and 42.8 parts of $CH_3(OC_2H_4)_9OH$ at 100° C. was added with stirring over a period of 30 minutes 33.3 parts of nonylnaphthylmethyl chloride. The reaction mixture was stirred and heated for an additional three and one-half hours at 100° C. It was dissolved in isopropanol and filtered to remove salt. The isopropanol solution was diluted with an equal volume of water and extracted several times with heptane. The solution was evaporated to yield 52 parts of an orange-colored oil. This corresponded in composition to $$C_9H_{19}C_{10}H_6CH_2(OC_2H_4)_9OCH_3$$

It was water-soluble and its solutions were capillary active. A wetting-out time of 33 seconds was found with a 0.5% solution by the floating patch test.

Example 24

By a procedure like that of Example 23 there were mixed 6.2 parts of potassium hydroxide and 69.2 parts of $CH_3(OC_2H_4)_{15}OH$. The mixture was reacted at 100° C. with 45.4 parts of nonylnaphthylmethyl chloride. Extraction was carried out as above and there was obtained an oil which corresponded in composition to $$C_9H_{19}C_{10}H_6CH_2(OC_2H_4)_{15}OCH_3$$

in an amount of 79.5 parts

This product was water-soluble and gave aqueous solutions of reduced surface and interfacial tension, having moderately good wetting, deterging, and dispersing actions.

Example 25

To a solution of four parts of sodium hydroxide in 44 parts of $CH_3(OC_2H_4)_9OH$ was slowly added with stirring at 90° to 100° C. 30.4 parts of dodecylmethylbenzyl chloride. The reaction mixture was kept at 100° for 30 minutes, dissolved in toluene, and filtered. The toluene was then removed by evaporation and the product was taken up in a 50:50 water-isopropanol mixture. This was washed with an equivalent amount of heptane, and evaporated to yield 35 parts of a light yellow oil which had the composition $$C_{12}H_{25}(CH_3)C_6H_3CH_2(OC_2H_4)_9OCH_3$$

It was water-soluble and gave solutions exhibiting capillary activity. A 0.5% aqueous solution had a wetting-out time of 16 seconds by the floating patch test.

Example 26

The procedure of Example 25 was followed with a mixture of 6.17 parts of potassium hydroxide in 69.2 parts of $CH_3(OC_2H_4)_{15}OH$ to which was added 33.9 parts of dodecylmethylbenzyl chloride. The product consisted of a light yellow oil in an amount of 87 parts. This was dissolved in a water-isopropanol mixture which was extracted with a close-cut aliphatic hydrocarbon. The alcohol-water solution was then evaporated and stripped under reduced pressure. There resulted a waxy solid, which corresponded in composition to $C_{12}H_{25}(CH_3)C_6H_3CH_2(OC_2H_4)_{15}OCH_3$

*Example 27*

A mixture of 6.2 parts of potassium hydroxide and 27 parts of octylbenzyl chloride was heated to 110° C. and reacted with 40.9 parts of a polyether alcohol, $CH_3(OC_2H_4)_nOH$, in which the average value of $n$ from the amounts of ethylene oxide used in its preparation was 9.3. The product was taken up in isopropanol and the solution filtered. Water was added to the filtrate and this solution extracted with heptane. The solution was evaporated to yield 47 parts of product.

A 1% aqueous solution of this product had a surface tension of 30 dynes/cm. At 1.0% the same value was found. At 0.01% the surface tension was 31.5 dynes/cm. Interfacial tensions against a white mineral oil were at 1% 4 dynes/cm., at 0.1% 5.5 dynes/cm., and at 0.01% 15 dynes/cm.

The above preparation was repeated with substitution of 42 parts of (2-octyl)benzyl bromide for the 27 parts of octylbenzyl chloride. The product was practically identical with that described above.

*Example 28*

To a solution of 5.6 parts of potassium hydroxide in 36.7 parts of $C_4H_9(OC_2H_4)_{15}OH$ at 110° C. there was slowly added 25.7 parts of nonylbenzyl chloride over a 0.5 hour period. The mixture was then heated at 120°–130° C. for four hours, cooled, diluted with toluene, filtered, treated with water and isopropanol, and the solution thus obtained concentrated to yield 38 parts of a straw-colored oil. This product was soluble in water to give capillary active solutions. It had the structure:

$C_9H_{19}C_6H_4CH_2(OC_2H_4)_{15}OC_4H_9$

*Example 29*

To a solution of 8.4 parts of potassium hydroxide pellets in 44.2 parts of polyether alcohols, $CH_3(OC_2H_4)_nOH$, in which $n$ had an average value of 9.3, heated to 100° C. there was slowly added 46.2 parts of dodecylmethylbenzyl chloride. The mixture was stirred and heated for four hours and carried to a temperature of 150° C. Toluene was added. The solution was filtered to remove potassium chloride and potassium hydroxide and the filtrate was evaporated to give 79 parts of a yellow oil. This was taken up in 50% aqueous isopropanol. The resulting solution was extracted with heptane to remove unreacted dodecylmethylbenzyl chloride. The solution was then evaporated to yield 60 parts of the desired product, $C_{12}H_{25}(CH_3)C_6H_3CH_2(OC_2H_4)_nOCH_3$ This product gave capillary active solutions. In aqueous solution at 1% of product the surface tension was 31.7, at 0.1% 32.2, at 0.01% 32.2, and at 0.001% 37.9 dynes/cm. Interfacial tensions of these solutions against a white mineral oil were 3.9, 6.4, 11.8, and 21.2 dynes/cm. respectively. A 0.3% solution gave a Draves wetting-out time of 10 seconds. Detergency results with standard soiled fabrics were good.

In the same way there was prepared the product $C_9H_{19}C_6H_4CH_2(OC_2H_4)_nOCH_3$, where $n$ had an average value of 9.3. Surface tensions of aqueous solutions were at 1% 29.6, at 0.1% 29.6, at 0.01% 31.2, and at 0.001% 44.0 dynes/cm. Interfacial tensions against the mineral oil were 3.8, 5.4, 13.5, and 23.1 dynes/cm. respectively. A 0.11% solution gave a Draves wetting-out time of 10 seconds.

*Example 30*

The procedure of Example 29 was repeated with substitution of 51.6 parts of $CH_3(OC_2H_4)_{11}OH$ for the polyether alcohol previously used. The product was a yellow oil which was similar to that of Example 29. Surface tension data were obtained as follows: at 1% 31.0, at 0.1% 31.3, at 0.01% 32.0, and at 0.001% 36.5 dynes/cm. Corresponding interfacial tensions against white mineral oil were 3.9, 6.3, 10.1, and 15.0 dynes/cm. respectively. A 0.44% solution gave a Draves wetting-out time of 10 seconds. A 1.4% solution gave a wetting-out time of 10 seconds in the floating patch test. Detergency as determined with standard soiled fabric was excellent.

In the same way there was prepared the product $C_9H_{19}C_6H_4CH_2(OC_2H_4)_{11}OCH_3$ Surface tensions of its aqueous solutions were at 1% 29.8, at 0.1% 29.7, at 0.01% 31.7, and at 0.001% 45.5 dynes/cm. Interfacial tensions against the mineral oil were 5.0, 5.8, 11.0, and 19.5 dynes/cm. respectively.

*Example 31*

By the procedures shown above 53 parts of $C_2H_5(OC_2H_4)_{11}OH$, 7 parts of powdered potassium hydroxide, and 37 parts of isononylbenzyl chloride were reacted and the product purified by the same steps used above. The product had a composition corresponding to $C_9H_{19}C_6H_4CH_2(OC_2H_4)_{11}OC_2H_5$ having properties essentially like those of the product of the nonylbenzyl compound in Example 30.

*Example 32*

There were mixed 69 parts of $CH_3(OC_2H_4)_{15}OH$ and 6.5 parts of potassium hydroxide and the mixture was heated to 110° C. Slowly thereto was added 42 parts of tetradecylmethylbenzyl chloride. The reaction mixture was heated for an additional two hours with the temperature being carried to 150° C. The reaction mixture was worked up as in previous examples with filtration of salt from a toluene solution and extraction of unreacted chloride. The product as obtained was a viscous oil which had the composition $C_{14}H_{29}(CH_3)C_6H_3CH_2(OC_2H_4)_{15}OCH_3$ Its aqueous solutions were capillary active.

*Example 33*

In the same way 69 parts of $CH_3(OC_2H_4)_{15}OH$, 6.5 parts of potassium hydroxide, and 56 parts of octadecylbenzyl chloride were reacted at 110°–150° C. for five hours. After dilution with toluene, filtration, stripping of solvent, solution in a 1:1 isopropanol-water mixture with extraction of heptane, and evaporation of the water-alcohol solution, there was obtained as a soft wax a product which had the composition $C_{18}H_{37}C_6H_4CH_2(OC_2H_4)_{15}OCH_3$ It was soluble in water and was capillary active. Its solutions were not rapid in their wetting action but gave fairly good soil removal in wash tests.

Example 34

There were mixed 180 parts of $$CH_3(OCH_2CH_2)_{40}OH$$

and 8.4 parts of potassium hydroxide and the mixture was heated to about 100° C. There was slowly added to this mixture 42 parts of tetradecylmethylbenzyl chloride. The reaction mixture was heated for four hours, the temperature being carried to 150° C. The reaction mixture was purified as above by removing the salt by filtration of a toluene solution and extracting unreacted chloride from an isopropanol-water solution with a water-immiscible solvent. The product obtained was a grease-like solid having the composition $$C_{14}H_{29}(CH_3)C_6H_3CH_2(OC_2H_4)_{40}OCH_3$$

This product was water-soluble. While it did not give a rapid rate of wetting-out, it was a good emulsifying agent for toluene and similar organic liquids, a fairly good assistant in kier-boiling, a fairly good detergent, and a good foaming agent.

Other polyethers with many ether groups, for example 20 to 40 such groups, behave much like the compound described just above. Tests with these compounds show that the range up to about 40 ether groups is a practical one and while more ether groups may be used, there is no particular need for going beyond a limit of 40.

Example 35

There were reacted 51.6 parts of $$CH_3(OC_2H_4)_{11}OH$$

6.5 parts of potassium hydroxide, and 40 parts of dodecylmethylnaphthylmethyl chloride by the method illustrated in the previous examples. After removal of salt by filtration from a toluene solution of the reaction mixture and extraction of an aqueous solution of the product, there was obtained a heavy amber-colored oil which was soluble in water and which gave marked reductions in surface and interfacial tensions. The product had a dispersing action on several types of carbon black and dyes. The structure of the product corresponds to $$C_{12}H_{25}(CH_3)C_{10}H_5CH_2(OC_2H_4)_{11}OCH_3$$

Example 36

A mixture of 71 parts of $C_2H_5(OC_2H_4)_{15}OH$ and 4.4 parts of sodium hydroxide was heated to 90° C. and 33 parts of nonyldimethylbenzyl chloride was slowly added. The reaction mixture was then heated to 140° for three hours. Salt was removed by filtration after dilution of the reaction product with isopropanol. The filtrate was extended with an equal volume of water and the resulting solution extracted with a petroleum ether. The solution was evaporated to yield an oil product which had the composition $$C_9H_{19}(CH_3)_2C_6H_2CH_2(OCH_2CH_2)_{15}OC_2H_5$$

This product was water-soluble and gave solutions of low surface and interfacial tensions. It was an effective wetting, emulsifying, and dispersing agent.

The compounds of this invention are characterized by being dispersible or soluble in aqueous solutions, imparting thereto a considerable lowering and interfacial tensions. They have wetting and dispersing actions. Their structure gives them greater stability in the presence of strong alkalies than compounds having a free hydroxyl group or compounds lacking the methylene group between the aryl nucleus and an ether oxygen atom. A preferred class of these compounds comprises those having octyl to dodecyl substituents on the aryl nucleus and nine to twelve oxyethyl groups. There are, however, special utilities for compounds having fewer or more such groups. A striking feature of these compounds is that they usually give less foam than other products which have a similar degree of capillary activity.

Because of the inertness and stability of these compounds they can be mixed with strong alkali cleaners such as sodium or potassium silicates or caustic soda without decomposition. Previously known non-ionic detergents develop considerable color when brought in contact with strongly alkaline reagents and thus give evidence of decomposition. There may be mixed about 0.5 to 10 parts of a compound of this invention with a strongly alkaline compound to give a composition useful for cleaning. The compound augments the action of the alkali, giving improved wetting and displacement of greasy soil. The compounds of this invention can also be used in strongly alkaline liquors, as in kier-boiling or refining of cellulose fibers.

I claim:

1. A process for preparing a surface-active compound of the formula $$R^1R^2R^3ArCH_2(OCH_2CH_2)_nOR^4$$

which comprises reacting at 80° to 150° C. an ether glycol of the formula $$HO(CH_2CH_2O)_nR^4$$

with a halide of the formula $$R^1R^2R^3ArCH_2X$$

in the presence of an equivalent of an alkali hydroxide, $R^1$ being an alkyl group of six to eighteen carbon atoms, $R^2$ and $R^3$ being members of the class consisting of hydrogen and the methyl group, $R^4$ being an alkyl group of not over four carbon atoms, Ar being an aromatic hydrocarbon nucleus of the class consisting of benzene and naphthalene groups, $n$ being a number from 6 to 40 and at least of sufficient size to ensure the dispersibility of the compound in water, and X being a halogen from the class consisting of chlorine and bromine.

2. A process for preparing a surface-active compound of the formula $$R^1C_6H_4CH_2(OCH_2CH_2)_nOCH_3$$

which comprises reacting at 80° to 150° C. an ether glycol of the formula $$HO(CH_2CH_2O)_nCH_3$$

with an equivalent of a halide of the formula $$R^1C_6H_4CH_2Cl$$

in the presence of an equivalent of an alkali hydroxide, $R^1$ being an alkyl group of six to eighteen carbon atoms and $n$ being a number from 6 to 40 and at least of sufficient size to ensure the dispersibility of the compound in water.

3. The process of claim 2 wherein $R^1$ is a nonyl group.

4. The process of claim 2 wherein $R^1$ is a dodecyl group.

5. A process for preparing a surface-active compound of the formula $$R^1(CH_3)C_6H_3CH_2(OCH_2CH_2)_nOCH_3$$

which comprises reacting at 80° to 150° C. an ether glycol of the formula $$HO(CH_2CH_2O)_nCH_3$$

with an equivalent of a halide of the formula $$R^1(CH_3)C_6H_3CH_2Cl$$

in the presence of an equivalent of an alkali hydroxide, $R^1$ being an alkyl group of six to eighteen carbon atoms and $n$ being a number from 6 to 40 and at least of sufficient size to ensure dispersibility of the compound in water.

6. The process of claim 5 wherein $R^1$ is a nonyl group.

7. The process of claim 5 wherein $R^1$ is a dodecyl group.

8. A process for preparing a surface-active compound of the formula $$R^1C_{10}H_7CH_2(OCH_2CH_2)_nOCH_3$$

which comprises reacting at 80° to 150° C. an ether glycol of the formula $$HO(CH_2CH_2O)_nCH_3$$

with an equivalent of a halide of the formula $$R^1C_{10}H_7CH_2Cl$$

in the presence of an equivalent of an alkali hydroxide, $R^1$ being an alkyl group of 6 to 18 carbon atoms, and $n$ being a number from 6 to 40 and at least of sufficient size to ensure dispersibility of the compound in water.

9. The process of claim 8 wherein $R^1$ is a nonyl group.

10. A surface-active compound of the formula $$R^1R^2R^3ArCH_2(OCH_2CH_2)_nOR^4$$

wherein $R^1$ is an alkyl group of six to eighteen carbon atoms, $R^2$ and $R^3$ are members of the class consisting of hydrogen and the methyl group, $R^4$ is an alkyl group of not over four carbon atoms, Ar is an aromatic nucleus of the class consisting of benzene and naphthalene groups, and $n$ is a number from six to forty.

11. A surface-active compound of the formula $$R^1C_6H_4CH_2(OCH_2CH_2)_nOCH_3$$

wherein $R^1$ is an alkyl group of six to eighteen carbon atoms and $n$ is a number from six to forty.

12. A compound of the formula $$C_9H_{19}C_6H_4CH_2(OCH_2CH_2)_nOCH_3$$

wherein $n$ is a number from six to forty.

13. A compound of the formula $$C_{12}H_{25}C_6H_4CH_2(OCH_2CH_2)_nOCH_3$$

wherein $n$ is a number from six to forty.

14. A compound of the formula $$R^1(CH_3)C_6H_3CH_2(OCH_2CH_2)_nOCH_3$$

wherein $R^1$ is an alkyl group of six to eighteen carbon atoms and $n$ is a number from six to forty.

15. A compound of the formula $$C_9H_{19}(CH_3)C_6H_3CH_2(OCH_2CH_2)_nOCH_3$$

wherein $n$ is a number from six to forty.

16. A compound of the formula $$C_{12}H_{25}(CH_3)C_6H_3CH_2(OCH_2CH_2)_nOCH_3$$

wherein $n$ is a number from six to forty.

17. A compound of the formula $$R^1C_{10}H_7CH_2(OCH_2CH_2)_nOCH_3$$

wherein $R^1$ is an alkyl group of six to eighteen carbon atoms and $n$ is a number from six to forty.

18. A compound of the formula $$C_9H_{19}C_{10}H_7CH_2(OCH_2CH_2)_nOCH_3$$

wherein $n$ is a number from six to forty.

PETER L. de BENNEVILLE.

REFERENCES CITED

The following references are of record in the file of this patent:

UNITED STATES PATENTS

| Number | Name | Date |
|---|---|---|
| 2,083,482 | Steindorff et al. | June 8, 1937 |
| 2,213,477 | Steindorff et al. | Sept. 3, 1940 |
| 2,360,301 | Emerson | Oct. 10, 1944 |

FOREIGN PATENTS

| Number | Country | Date |
|---|---|---|
| 343,930 | Germany | Nov. 11, 1921 |
| 369,883 | Italy | Apr. 3, 1939 |